(12) United States Patent
Coskun et al.

(10) Patent No.: US 7,986,636 B2
(45) Date of Patent: Jul. 26, 2011

(54) EFFICIENT DETECTION OF RELAY NODE

(75) Inventors: Baris Coskun, Brooklyn, NY (US); Nasir Memon, Holmdel, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 20 days.

(21) Appl. No.: 12/268,395

(22) Filed: Nov. 10, 2008

(65) Prior Publication Data
US 2009/0154375 A1 Jun. 18, 2009

Related U.S. Application Data

(60) Provisional application No. 60/986,937, filed on Nov. 9, 2007.

(51) Int. Cl.
*H04L 12/28* (2006.01)
(52) U.S. Cl. ........ 370/254; 370/401; 370/469; 370/235; 726/23
(58) Field of Classification Search .................. 370/401, 370/469, 232, 235; 709/227
See application file for complete search history.

(56) References Cited

U.S. PATENT DOCUMENTS 6,539,432 B1 * 3/2003 Taguchi et al. ............... 709/227
2006/0176887 A1 * 8/2006 Fair et al. ...................... 370/401

* cited by examiner

*Primary Examiner* — Robert W Wilson
*Assistant Examiner* — Mohamed Kamara
(74) *Attorney, Agent, or Firm* — John C. Pokotylo; Straub & Pokotylo (57) ABSTRACT

Whether or not a node is a relay node may be determined by, for each of a plurality of active flows, assigning a random number to the flow, wherein each of the random numbers is drawn from a distribution. Then, for each of a plurality of time slots, any incoming flows to the node and any outgoing flows from the node may be determined, random numbers assigned to any active flow of the incoming flows may be summed to generate a first sum, random numbers assigned to any active outgoing flows may be summed to generating a second sum, and the first sum may be multiplied with the second sum to generate a product associated with the time slot. The products over the plurality of time slots may then be summed to obtain a summed product. This may be repeated, reassigning random values to each of the plurality of flows, thereby obtaining a plurality of summed products. A variance of the plurality of summed products may be determined and compared with a threshold to obtain a comparison result. Whether or not the node is a relay node may then be determined using the comparison result. Execution of a relay node protection policy may be controlled using the determination of whether or not the node is a relay node.

6 Claims, 6 Drawing Sheets

| NODE ID | TIME DURATION | TIME SLOT | GENERATED RANDOM NUMBER | ACTIVE/ PASSIVE FLAG | TIME/DATE STAMP | RELAY NODE FLAG |
|---|---|---|---|---|---|---|
| 310 | 320 | 330 | 340 | 350 | 360 | 370 |
| | | | | | | |
| ... | ... | ... | ... | ... | ... | ... |
| | | | | | | |

EFFICIENT DETECTION OF RELAY NODE

§0. PRIORITY CLAIM

This application claims the benefit of U.S. Provisional Patent Application Ser. No. 60/986,937 (incorporated herein by reference and referred to as "the '937 provisional"), titled "EFFICIENT DETECTION OF DELAY-CONSTRAINED RELAY NODES" filed on Nov. 9, 2007, and listing Baris COSKUN and Nasir MEMON as the inventors. The present invention in not limited to requirements of the particular embodiments described in the '937 provisional.

§1. BACKGROUND OF THE INVENTION

§1.1 Field of the Invention

The present invention concerns detecting a relay node in a network. In particular, the present invention concerns determining whether or not a node in a network is a relay node.

§1.2 Background Information

In a typical network, there can be various situations where a node receives data from another node and forwards it to some others. Such nodes are often called "relay nodes". Relay nodes can be employed for many different purposes which can be either legitimate or malicious. For instance, an enterprise may be running a legitimate peer-to-peer video streaming application for the benefit of its employees. On the other hand, an employee could be violating company policy by running a peer-to-peer application to watch live television on the desktop. Similarly, a system administrator may be connected from home to a server and logs in from that server using SSH to one of the internal machines in order to check its status. This would be an example of a legitimate stepping stone connection. Stepping stones, however, are commonly used by hackers to make attack traceback difficult.

Regardless of the original intention, relay nodes are a potential threat to networks since they are used in various malicious situations like stepping stone attacks, botnet communication, illegal peer-to-Deer file sharing or streaming etc. Hence, quick and accurate detection of relay nodes in a network can significantly improve security policy enforcement. There has been significant work done and novel solutions proposed for the problem of identifying relay flows active within a node in the network.

Relay nodes can be divided into two main categories—Store Forward and Delay Constrained. Each is introduced below.

Store & Forward relay nodes often store data before forwarding. Peer to peer file sharing and email relaying are some examples of store and forward relays. The time elapsed before the data is forwarded depends on application requirements. For instance email relays forward received emails after few minutes, whereas in peer to peer file sharing applications data is forwarded only when another user requests it. Delay-Constrained relay nodes forward the received data within a maximum tolerable delay constraint. The delay requirement is inherent in the underlying application. Delay-constrained relaying can be done by applications which are either interactive or machine driven. For instance, stepping stones and IM message routing nodes are some examples of delay-Constrained relays with interactive sessions. On the other hand, peer to peer live broadcast and Skype super-nodes are examples of machine-driven delay-constrained relays.

Detection of store and forward type of relays is generally done by identifying protocol features. Usually a target protocol is selected and its distinctive characteristics are identified. Subsequently, a node that exhibits such characteristics is declared as a relay node. Some such protocol features used by researchers include connections to known ports, some specific signatures in the payload, concurrent use of both UDP and TCP etc. This work will mainly focus on delay-constrained relays. Further details on store and forward relay node detection schemes are described in the articles A. Gerber, J. Houle, H. Nguyen, M. Roughan, and S. Sen, "P2p the gorilla in the cable," *National Cable and Telecommunications Association* (*NCTA*) 2003 *National Show*, Chicago, Ill., Jun. 2003, T. Karagianis, A. Broido, M. Faloutsos, and K. Claffy, "Transport layer identification of p2p traffic," *Proc. 4th ACM SIGCOMM Conf. on Internet Measurement*, Taorminia, Sicily, Italy, October 2004, R. Meent and A. Pras, "Assessing unknown network traffic," *CTIT Technical Report* 04-11, University of Twente, Netherlands, February 2004, S. Ohzahata, Y. Hagiwara, M. Terada, and K. Kawashima, "A traffic identification method and evaluations for a pure p2p application", *Lecture Notes in Computer Science*, volume 3431, 2005, and S. Sen, O, Spatscheck, and D. Wang "Accurate, scalable in-network identification of p2p traffic using application signatures" *Proc, 13th Int. Conf. on World Wide Web*, NY, 2004.

Prior work that focuses on the delay-constrained relay node detection problem has been limited. Although, there has been some work on the delay-constrained relay flow detection problem such as articles by D. S. A. Blum and S. Venkataraman, "Detection of interactive stepping stones: Algorithms and confidence bounds," *Conference of Recent Advance in Intrusion Detection* (*RAID*), Sophia Antipolis, French Riviera, France, September 2004, D. Donoho, A. G. Flesia, U. Shankar, V. Paxson, J. Coit, and S. Staniford, "Multiscale stepping-stone detection: Detecting pairs of jittered interactive streams by exploiting maximum tolerable delay," *Fifth International Symposium on Recent Advances in Intrusion Detection, Lecture Notes in Computer Science* 2516, New York, Springer, 2002, S. Staniford-Chen and L. Heberlein, "Holding intruders accountable on the internet," *Proc. IEEE Symposium on Security and Privacy*, Oakland, Calif., page 3949, May 1995, K. Yoda and H. Etoh, "Finding a connection chain for tracing intruders," F. Guppens, Y. Deswarte, D. (Collamaun, and M. Waidner, editors, *6th European Sympoisum on Research in Computer Secrit—ESORICS* 2000 LNCS—195, Toulouse, France, October 2000, and Y. Zhang and V. Paxson, "Detecting stepping stones," *Proceedings of the 9th USENIX Security Symposium*, pages 171, 184, August 2000, detection of relay flows implies identification of relay nodes has been difficult. The basic detection methodology in the proposed delay constrained relay flow detection schemes is to search for network flow pairs which exhibit strong mutual correlation. This correlation is determined based on various attributes, of the flow, including packet content (payload), packet arrival times, packet lengths, etc. Regardless of how the correlation is determined, all these methods compare each incoming flow to each outgoing one. Therefore they require quadratic time, which may be prohibitive for medium to large scale networks with tens of thousands of nodes and thousands of active connections in many nodes.

§1.2.1 Previous Approaches and Perceived Limitations of Such Approaches

Research on relay detection such as delay constrained relay nodes has mostly focused on stepping stones due to their obvious potential malicious intention. (See, e.g., S. Staniford-Chen and L. Heberlein, "Holding intruders accountable on the internet," *Proc. IEEE Symposium on Security and Privacy*, Oakland, Calif., page 3949, May 1995.) The Staniford-Chen article propose a content correlation based scheme where flow pairs are compared in terms of thumb-prints of their content. Although they achieve good performance, content based schemes have limited applicability since flows are usually encrypted and their contents are inaccessible. This fact motivated researchers to focus on layer 3 information which mostly consists of originating and destination IP addresses, originating and destination port numbers, layer 3 protocol type (TCP or UDP), packet arrival times and packet lengths. In the first work that incorporates layer 3 information. Zhang and Paxson in their article (Y. Zhang and V Paxson, "Detecting stepping stones," *Proceedings of the 9th USENIX Security Symposium*, page 171, 184, August 2000) discuss detecting stepping stones by correlating flows in terms of their ON and OFF periods. The assumption is that correlated flows switch from OFF state to ON state at similar times. In an article, K. Yoda and H. Etoh, "Finding a connection chain for tracing intruders," F. Guppens, Y. Deswarte, D. Gollamann, and M. Waidner, editors, *6th European Symposium on Research in Computer Security—ESORICS* 2000 LNCS—1985, Toulouse, France, October 2000, Yoda and Etoh propose a similar timing based algorithm where correlation is defined over sequence number vs. time curves of the flows. Another timing based algorithm is proposed by He and Tong in their article, T. He and L. Tong, "A signal processing perspective of stepping-stone detection," *Proc. of IEEE CISS* '06, Princeton, N.J., 2006, where authors formulate the flow correlation problem as a nonparametric hypothesis testing. Other than stepping stones, in an article, K. Sulh, D. Figueiredo, J. Kurose, and D. Towsley, "Characterizing and detecting skype-relayed traffic," *Proc. of Infocom,* 2006, Suh et. al. proposed a similar timing based technique for detecting Skype related relay traffic.

Although timing based methods perform quite well, unfortunately they fall short when the time structure of the relaying flows is perturbed by an attacker. This perturbation may be performed by means of introducing artificial delays before relaying the received packet or by adding chaff packets into the stream. In an article, D. Donoho, A. G. Flesia, U. Shankar, V. Paxson, J. Coit, and S. Staniford, "Multiscale stepping-stone detection: Detecting pairs of jittered interactive streams by exploiting maximum tolerable delay," *Fifth International Symposium on Recent Advances in Intrusion Defection, Lecture Notes in Computer Science* 2516, New York, Springer, 2002, Donoho et. al. shows that if there is a maximum tolerable delay constraint, instead of using raw packet timing information, applying wavelet decomposition and analyzing packet timings in different (lower) resolutions will make the effect of the adversarial changes in time structure insignificant. Similarly under a maximum tolerable delay constraint, Blum et. al. present confidence bounds on the stepping stone detection problem in an article, D. S. A. Blum and S. Venkataraman, "Detection of interactive stepping stones: Algorithms and confidence bounds," *Conference of Recent Advance in Intrusion Detection (RAID)*, Sophia Antipolis, French Riviera, France, September 2004. As a completely different approach, in the article, X. Wang and D. S. Reeves, "Robust correlation of encrypted attack traffic through stepping stones by manipulation of interpacket delays" *CCS '03: Proceedings of the 10th ACM conference on Computer and communications security*, pages 20-29, 2003, Wang and Reeves propose a watermarking based approach where selected packet timings are slightly adjusted on all incoming flows. In order to identify a relaying flow, a watermark detection procedure has is applied to all outgoing flows. Although this technique is a form of timing based flow correlation algorithm, it is shown to be robust against timing perturbations introduced by adversaries.

As previously noted, flow correlation based techniques solve the problem in quadratic time. They need to compare each incoming flow to each outgoing flow. Therefore it is not easy to employ these methods in large networks. One could adopt filtering techniques to alleviate this problem to some extent. For instance, in the article, Y. Zhang and V. Paxson, "Detecting stepping stones," *Proceedings of the 9th USENIX Security Symposium*, page 171184, August 2000, specific flow pairs are filtered out based on packet size, inconsistent source and destination ports, inconsistent packet direction, inconsistent packet timing etc. However, discarding information usually brings a potential threat to detection performance since the real relaying flows could be filtered out or adversaries could manipulate flow characteristics to get filtered out. Therefore, a more scalable solution for relay detection problem would be of potential value in many situations.

§2. SUMMARY OF THE INVENTION

Embodiments consistent with the present invention may be used to detect relay nodes and more preferably, delay-constrained relay nodes. The existence of relay problem is reformulated as a variance estimation problem and a statistical approach employed to solve the problem in linear time which makes it viable to incorporate in large scale networks. For many of these large scale scenarios, however, instead of identifying relay flows, identifying relay nodes could be sufficient to take appropriate action. In addition a lightweight and scalable solution to the problem of delay-constrained relay node detection can serve as a first step in a scalable relay flow detection solution that performs one of the known quadratic time analysis techniques for relay flow detection only on nodes that have been determined to be relay nodes. This strategy brings significant computational efficiency to the existing schemes since the flow detection algorithm is now applied on few selected nodes rather than every node in the network.

Embodiments consistent with the present invention may be used to determine whether or not a node in a network is a relay node, by assigning for each of a plurality of flows, a random number to the flow, wherein each of the random numbers is drawn from a known distribution. For each of a plurality of time slots, any incoming flows to the node and any outgoing flows from the node are determined. The random numbers assigned to any active flow of the incoming flows are summed to generate a first sum, and the random numbers assigned to any active flow of the outgoing flows are summed to generate a second sum, the first sum is multiplied with the second sum to generate a product associated with the time slot, and these products are summed over the plurality of time slots to obtain a summed product, and these steps are repeated by reassigning random values to each of the plurality of flows, thereby obtaining a plurality of summed products. A variance of the plurality of summed products is determined and compared with a threshold to obtain a comparison result. Whether or not the node is a relay node may then be determined, using the comparison result. The execution of a relay node protection policy may be controlled using the determination of whether or not the node is a relay node.

§4. DETAILED DESCRIPTION

The present invention may involve novel methods, apparatus, message formats, and/or data structures to identify a possible "relay node" (a node in the network that has an active relay flow). The present invention may do so by formulating the problem as a variance estimation problem and proposing a solution in a statistical approach. The present invention utilizes linear time and space in the number of flows and therefore can be employed in large scale implementations. It can be used on its own to identify relay nodes or as a first step in a scalable relay flow detection solution that performs known quadratic time analysis techniques for relay flow detection only on nodes that have been determined to contain relay flows. Experimental results show that the present invention is able to detect relay nodes even in the presence of intentional inter-packet delays and chaff packets introduced by adversaries in order to defeat timing based detection algorithms.

The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 General Environment and Method for Detecting Relay Nodes

§4.1.1 Definitions

A "flow" may include a collection of packets which share the common five-tuple of source IP, source port, destination IP, destination port and layer 3 protocol type (UDP or TCP).

An "active flow" is a flow in a time slot if that flow has at least one packet in that time slot. Thus, in a given flow, if a flow has at least one packet which are transmitted within a given time slot, then that flow is regarded as being active within that particular time slot.

A flow is an "incoming flow" for a particular node if the destination IP of the flow is equal to the IP of that node.

A flow is an "outgoing flow" for a particular node if the source IP of the flow is equal to the IP of that node.

A "time slot" in terms of time axis, can be considered as a sequence of equal length time intervals.

§4.2 Efficient Detection of Relay Nodes

Network-based techniques to identify nodes that are potentially relay nodes are described. Such techniques should even allow the detection of relay node existence which cannot be reliably detected using conventional detection techniques. Embodiments consistent with the present invention may observe the behavior of a set of nodes at a network level. Such embodiments may be viewed as an initial step in network relay node detection method, which may be followed by more targeted policy-based techniques to determine the type and extent of the existence of relay nodes.

A scalable linear time solution to the problem of detecting delay constrained relay nodes in a network is described. Embodiments consistent with the present invention may adopt a simple technique which basically assigns random numbers to each flow and performs few simple arithmetic operations on these numbers.

It should be noted that, although not limited from the flow correlation based techniques, embodiments consistent with the present invention preferably identify the relay node in linear time and utilizing further techniques, can, identify the specific pair of flows that are correlated. In other words, embodiments consistent with the present invention may be utilized at the node level, whereas most of the techniques discussed in the Background Information have flow-level resolution. However, in many cases, identifying relay nodes may be all that a system administrator needs before initiating a more thorough analysis of the situation. If further investigation is required, one can always apply a flow correlation based technique to only that particular node identified as a potential relay node, thereby significantly improving the overall computational efficiency of relay flow detection within the network.

Embodiments consistent with the present invention are robust, to some extent, against adversarial manipulations that change the time structure of the flows such as intentional delays or chaff packets. The inventors' experiments have shown that the embodiments consistent with the present invention can still detect relay node activity after introducing random delays between incoming packets and relay packets. Also the inventors' experiments demonstrate that adding chaff packets to the stream has virtually no effect on the detection performance.

In at least some embodiments consistent with the present invention, to determine the existence of relay nodes, in a network system (e.g., a networked computer system such as a gateway), an evaluation is performed on the nodes by an agent. Embodiments consistent with the present invention may be applied to the monitoring of different types of nodes for evaluating the existence of relay nodes. Thus, such embodiments may involve analyzing the change in response-time characteristics in response to network events that happen in a sequence.

§4.2.1 Exemplary Environment

Figure 1:
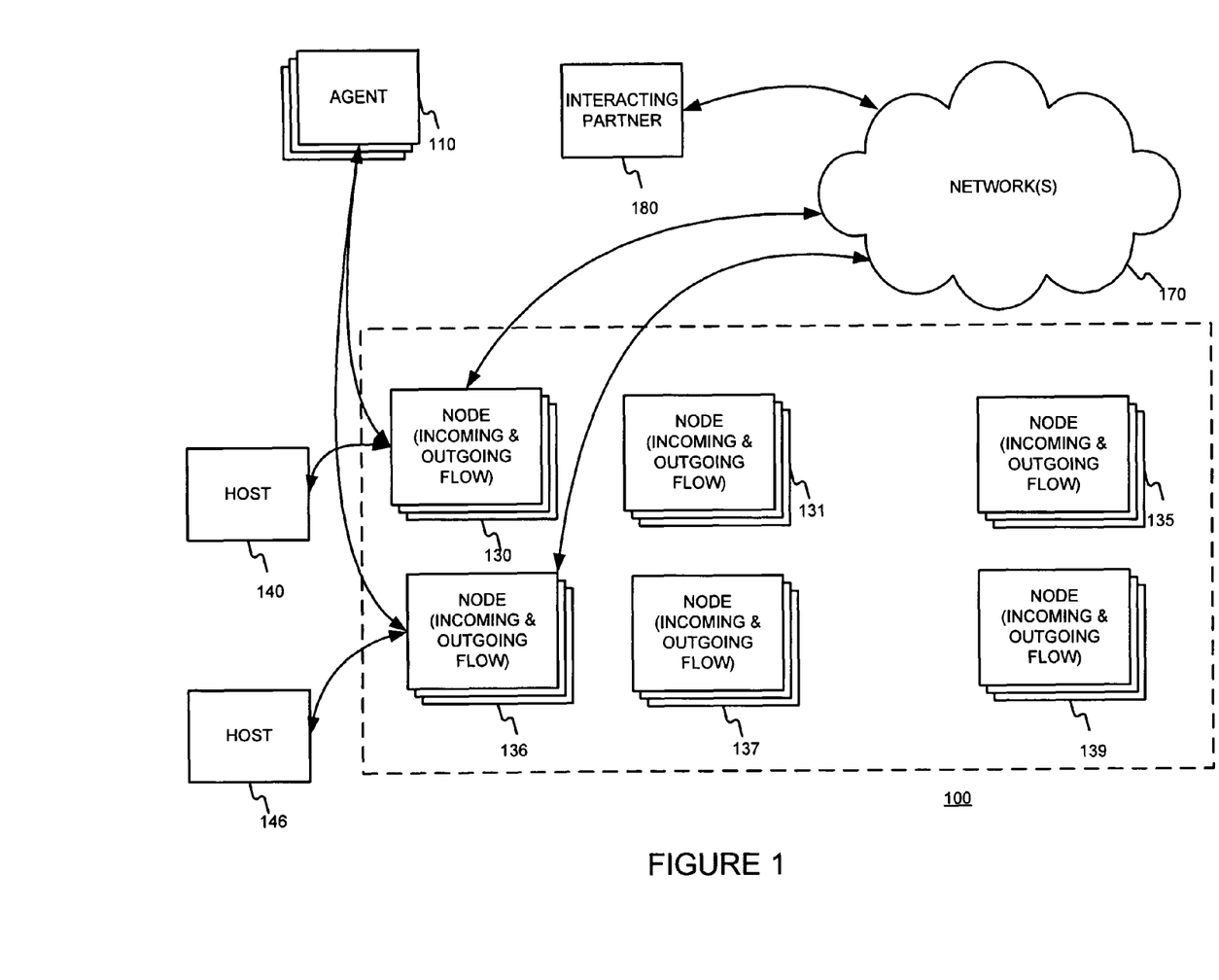
FIG. 1 is an exemplary environment illustrating components of an exemplary system consistent with the present invention

FIG. 1 is an exemplary environment illustrating components of an exemplary system consistent with the present invention. Specifically, the components may include a diagnosing agent 110, a gateway 120, that includes nodes 130-139 for facilitating incoming flows and outgoing flows communicated through the network(s) 170. A node may or may not be a relay node. The nodes 130-139 interact with the network 170 within a set of agreed protocols, wherein the interaction can be viewed as a set of packet flows which can be monitored by the diagnosing agent 110. The diagnosing agent 110 observes the communication between the node 130 and the network 170 and is aware of the details of the protocols used for the communication. The diagnosing agent 110 may simulate/assume the role of an interacting-partner 180, may function as a gateway proxy to the host 140, and/or may be any other intermediary that relays the communication between the host 140 and the interacting partner 180. Moreover, the diagnosing agent 110 may monitor various network protocol events and transactions that may occur between a host 140 and an interacting partner 180, thereby allowing the diagnosing agent 110 to detect the relay node 136.

§4.2.2 General Methods and Data Structures

Figure 2:
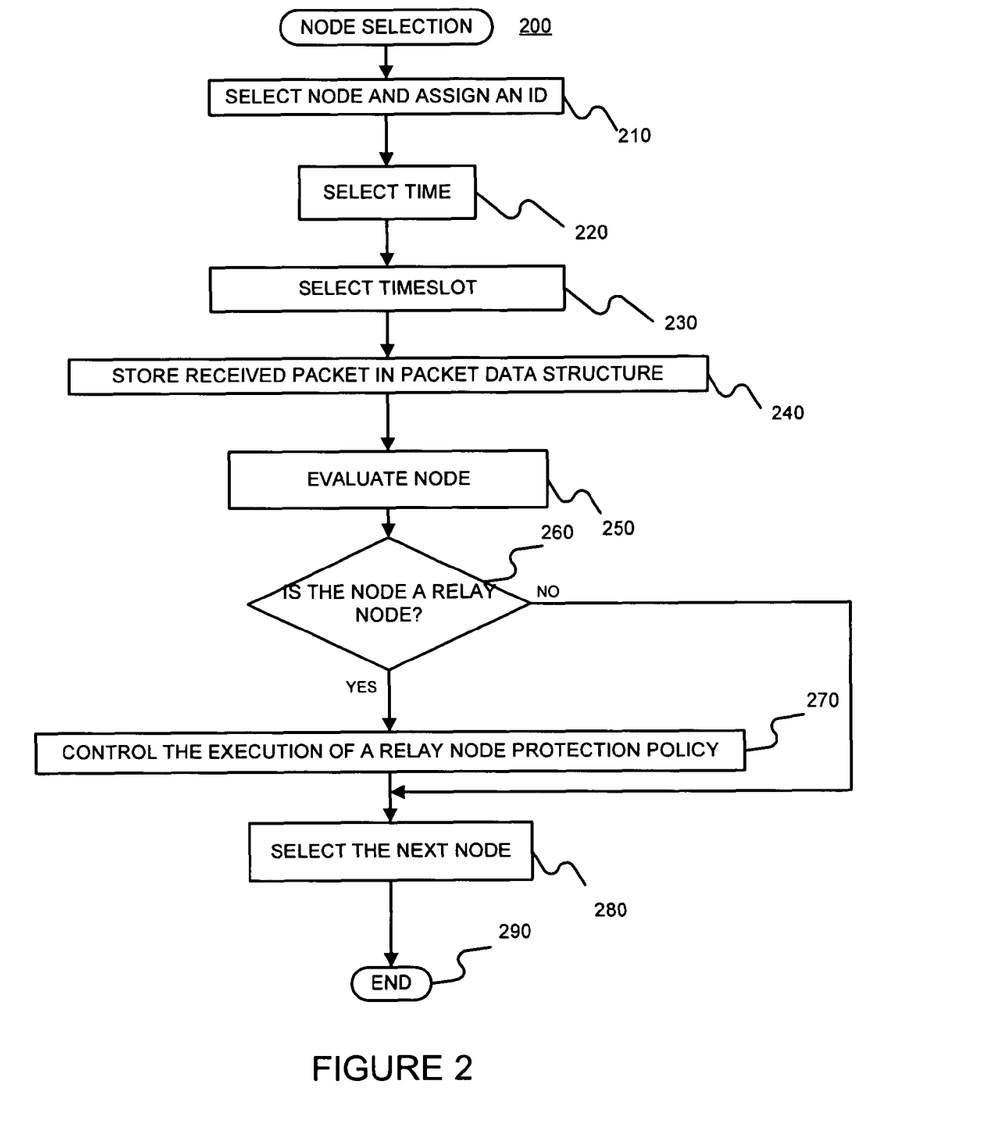
FIG. 2 is a flow diagram of an exemplary method that may be used to select a node, for purposes of facilitating relay node detection, in a manner consistent with the present invention.

FIG. 2 is a flow diagram of an exemplary node selection method 200 that may be used to select a particular node 136. Specifically, the diagnosing agent 110 consistent with the present invention may observe the plurality of nodes 130-139 and methodically (or randomly) choose a particular node 136 to analyze to determine whether the particular node is a relay node. For the gateway 120 with a plurality of nodes, the agent 110 may select a node 136 for evaluation, and after the evaluation is completed, choose another node (e.g., the nodes adjacent to it) in a methodical manner to determine whether each node is a relay node.

In block 210, the diagnosing agent 110 may associate the node 136 to be analyzed with an ID. Then, the diagnosing agent 110 selects a particular time period for the analysis to be completed (block 220). Experiments have shown that even a time duration of less than a minute is sufficient to evaluate a node. Once the time is selected, the diagnosing agent may use a standard timeslot or determine a custom timeslot (block 230) depending on various criteria such as the characteristic of the data packet in the incoming and outgoing flows. Once the time slot is selected, the diagnosing agent stores (block 240) the selection in a database (an example of which is described below with reference to FIG. 3). The diagnosing agent then evaluates the data under the relay node evaluation method (block 250) (an example of which is described below with reference to FIG. 4). The relay node evaluation method allows the diagnosing agent 110 to determine whether the node being analyzed is a relay node. If the node being analyzed is a relay node (block 260), the diagnosing agent 110 executes a node protection policy (block 270) (examples of which are described further in detail with reference to FIG. 4). If the node being analyzed is not a relay node, then the diagnosing agent 110 selects the next node (block 280) and continues the process until all nodes under consideration have been evaluated.

Figure 3:
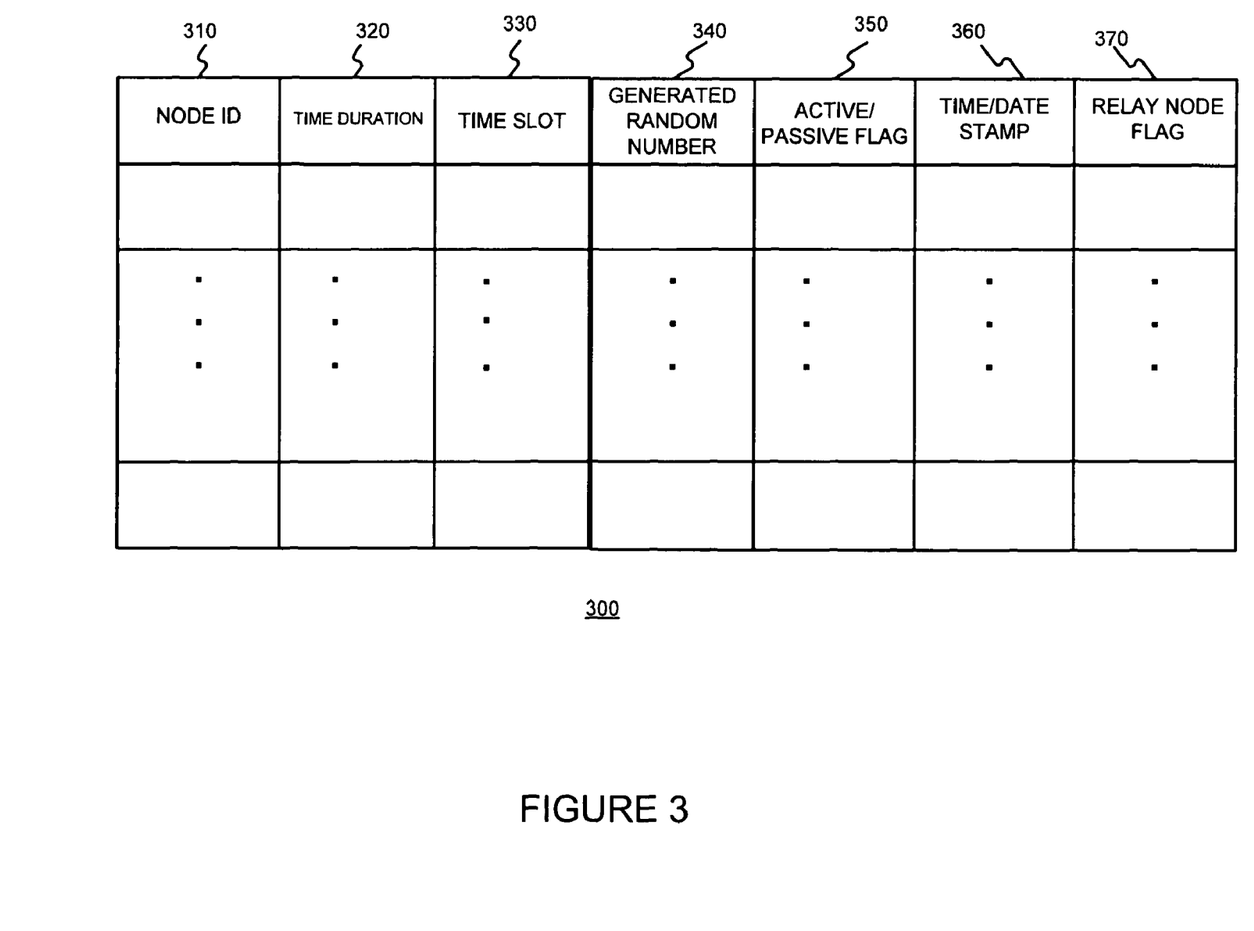
FIG. 3 is an exemplary data structure illustrating the tracked and saved information, which may have been acquired during relay node evaluation by a diagnosing agent, consistent with the present invention.

FIG. 3 is an exemplary data structure 300 illustrating information which may have been acquired and saved during the node selection by the diagnosing agent 110, consistent with the present invention. In particular, as illustrated by the columns of the data structure 300, the diagnosing agent 110 may measure and save information such as, for example, node ID 310, time duration for the analysis 320, time slot 330, random number generated 340, active/passive flag 350, time/date stamp 360, and relay node flag 370. Column 310 may simply include a number of identifications of the nodes being monitored within a network. Column 320 may include the time duration for which the evaluation was conducted. Column 330 may include the timeslot selected or the standard timeslot used in the analysis. Column 340 may include the random number generated according to a known distribution which is then applied to an incoming or outgoing flow, if the flow is active. Column 350 may include a flag as to whether the node is active or passive according to the definition given above. Column 360 may include a time and date stamp of the measurement. Finally, column 370 may include the final evaluation result as to whether the particular node is a relay node or not. Using the information from the exemplary data structure 300, the agent 110 may generate a report or a policy enforcement that enables a node to be activated/deactivated.

Once the particular node 136 is selected, the method selects a particular time for the evaluation to take place. For many applications, identifying relay nodes is sufficient to take an appropriate action. In this case, the contribution of the proposed scheme is to a great extent in terms of computational complexity since it flags relay nodes (or potential relay nodes) very efficiently. If an application requires flow level relay identification, on the other hand, one of the existing relay flow detection techniques can be subsequently applied to the relay nodes which have been flagged by the proposed method. The contribution here is also in terms of computational complexity as quadratic time relay flow detection algorithms now have to be executed only for flagged nodes rather than every node in the network. In either case, embodiments consistent with the present invention make the relay detection problem scalable for large scale implementations where thousands of nodes might be monitored simultaneously in real time.

Experimental results show that the proposed scheme is quite robust against various possible adversarial or non-adversarial modifications on the underlying network traffic. In summary, the experiments reveal that the proposed scheme still works to some extent under the presence of packet delays which could be introduced due to packet processing in the relay node or to adversarial purposes. Also the algorithm is shown to be able to detect the relay activity even if the flows contain chaff packets which are intended to defeat relay detection systems.

§4.2.3 Relay Node Evaluation Method

Figure 4:
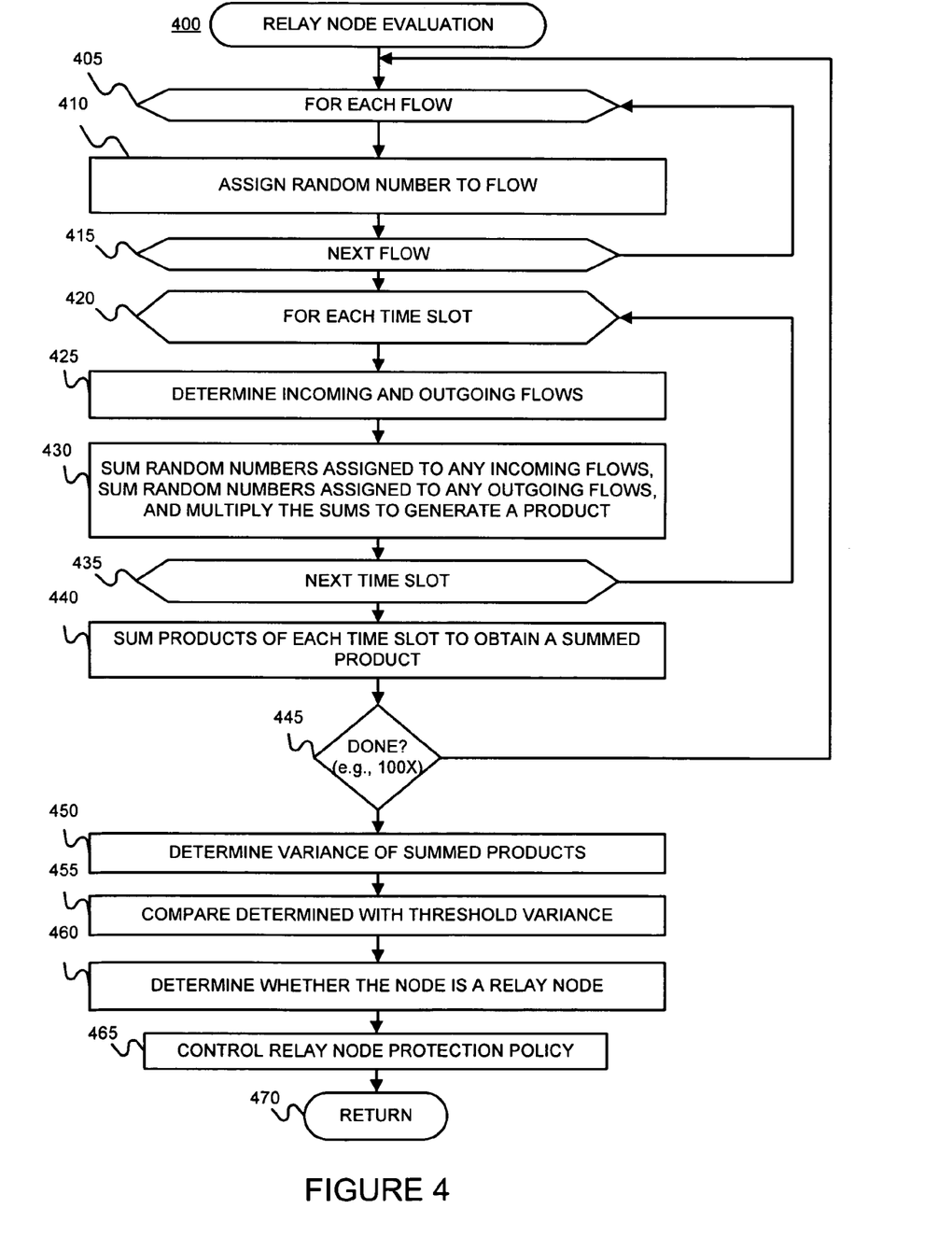
FIG. 4 is a flow diagram of an exemplary method that may be used to evaluate an existence of a relay node, as determined by a diagnosing agent, consistent with the present invention.

In FIG. 4, the method 400 evaluates whether a node is a relay node, in a manner consistent with the present invention. Specifically, for each of a set of flows (loop 405-415), the method 400 may assign a random number to the flow (block 410). This random number is preferably drawn from a known distribution. Further, the distribution may use a zero-mean distribution to utilize its standard variance. This set of flows is continued until a random number is generated and associated for both incoming active flows and the outgoing active flows (loop 405-415).

Subsequently, for each of a plurality of time slots (loop 420-435), the method 400 may determine any incoming flows to the node and determine any outgoing flows for a particular node (block 425). The method 400 then sums the random numbers assigned to the active incoming flows to generate a first sum (block 430). The method 400 also sums the random numbers assigned to any active outgoing flows to generate a second sum. Then, the method 400 may multiply the first sum with the second sum for each timeslot to generate a product associated with the time slot (block 430). Subsequently, method 400 sums the products over the plurality of time slots to obtain a summed product (block 440).

The method 400 repeats the above steps, reassigning random values to each of the plurality of flows, thereby obtaining a plurality of sum products (block 445). The method 400 then utilizes the plurality of sums to determine a distribution having a variance (block 450). The method 400 compares the determined variance against a threshold to obtain a comparison result (block 455). Because the distribution is a known distribution, the accepted baseline variance characteristic is also known. If the method 400 determines that the variance is more than the variance of the known distribution, the method 400 determines that the node is a (e.g., potential) relay node using the comparison result (block 460).

If a node is determined to be a (potential) relay node, the method 400 executes a relay node protection policy (block 465). For example, the method 400 may flag a policy system or alert the system administrator of possible existence. The acts performed by steps 405 to 465 may be repeated at different times on different nodes so that the node characteristic can be rechecked or checked for all the nodes under consideration.

§4.2.4 Exemplary Calculation

Figure 5:
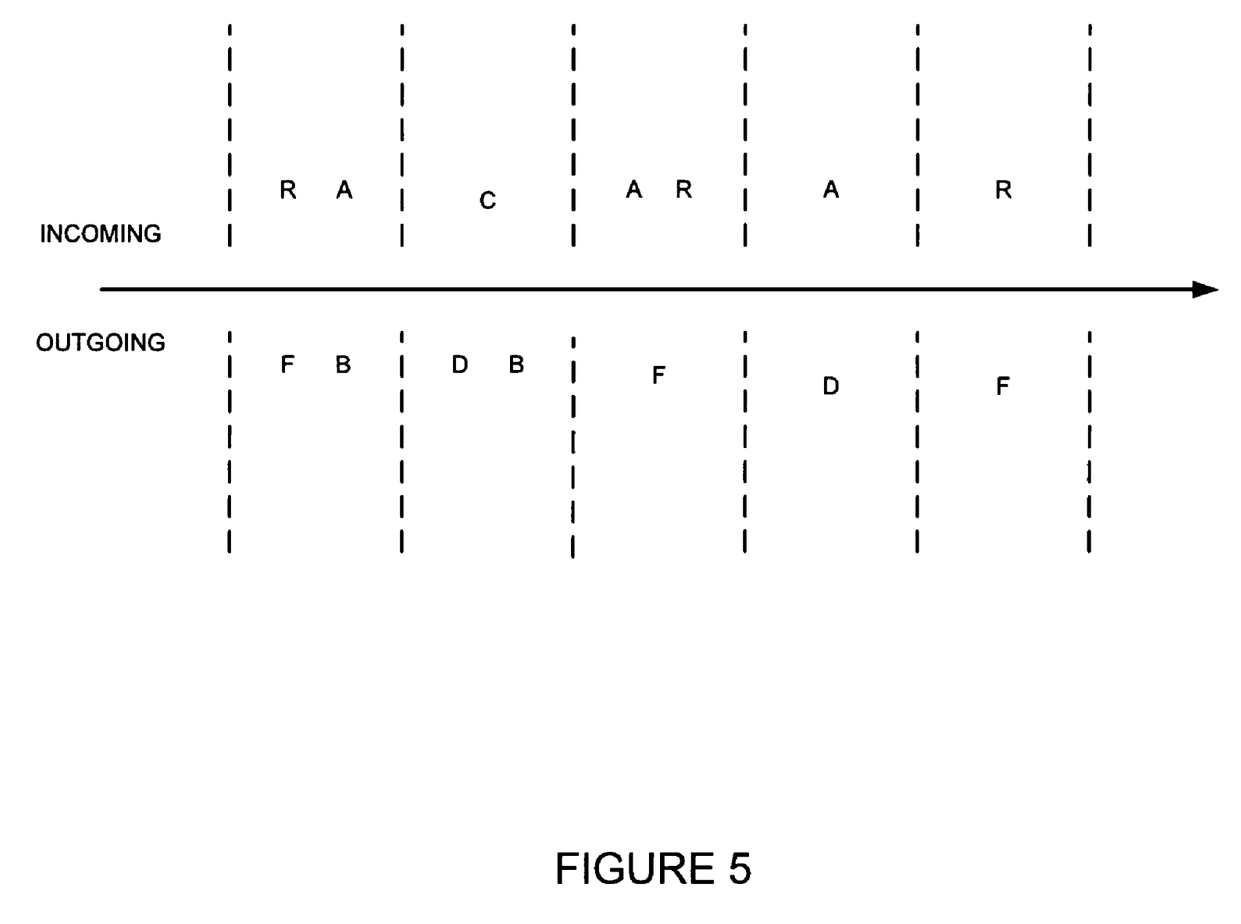
FIG. 5 is an exemplary environment illustrating possible calculations for evaluating a node, consistent with the present invention.

A basic idea of the proposed technique relies on the fact that the incoming and outgoing components of relay flow have to transmit at least some of the packets (non chaff packets) at similar times (within the maximum tolerable delay duration). That is, if the time axis is considered as a sequence of time slots, the corresponding incoming and outgoing flows of the relay would be simultaneously active within some of the time slots. This observation is illustrated in FIG. 5, where the incoming flow R and outgoing flow F are relayed by the node. FIG. 5 illustrates a simple calculation by a diagnosing agent (110) against the active flows for the node (136) in a short period of time in a manner consistent with the present invention. The outgoing flow F relays information coming from the incoming flow R. It is observed that, in order to forward the received information through flow R, flow F is also active in the same time slots as flow R.

In order to capture this correlation of relaying flows, each flow is assigned a random number drawn from a zero-mean known distribution. Then, for each time slot, the random numbers assigned to active incoming flows are summed and multiplied to the sum of random numbers assigned to the active outgoing flows. Finally the results of each time slot are added together and an overall sum value is obtained. Calculation of this overall sum (S) is summarized below for the flows shown in FIG. 5. Note that here the letters A, B, C etc. represent the assigned random numbers to the corresponding flows shown in FIG. 5.

$$S = (R+A)(F+B) + C(D+B) + (A+R)F + AD + RF$$
$$= RF + RB + AF + AB + CD + CB + AF + RF + AD + RF$$
$$= 3 \times RF + (RB + AF + AB + CD + CB + AF + AD)$$
$$= 3 \times RF + \text{sum(Random Numbers)}$$

It is observed above that, thanks to distributive property of multiplication over addition, this calculation is effectively equivalent to assigning a random number to each active flow pair and then summing the numbers up over all active flows. Therefore, the random number assigned to the correlated flow pair appears multiple times in the summation and somewhat can be considered as a constant term in the summation. In other words, if there were no correlated relaying flows, "S" would be the sum of random numbers coming from a zero-mean known distribution. Consequently "S" itself would be a random number coming from another zero-mean known distribution. However, the presence of a correlated flow pair acts as a constant term in the summation and therefore changes the governing distribution of "S". Hence, based on a simple statistical test applied on calculated "S" values, one can classify a node as being a relay or not. The mathematical details of this scheme are presented below.

Also, embodiments consistent with the present invention also provide a solution for the request-response based protocols (e.g., TCP). Under the TCP, flows which carry requests and corresponding flows which carry responses are often active within the same time slots. Consequently, network nodes which use such protocols would be automatically declared as relay nodes by the scheme described above. But there is a simple fix to this problem. Thus, only one flow of such flow pairs should contribute to the summation process which has been outlined above and the other flow should simply be ignored. This solution can easily be implemented by checking if a random number has already been accumulated for a flow which has the exact reverse direction (i.e., source and destination IP addresses are swapped, source and destination ports are swapped and layer 3 protocol is the same) of a given flow. If the answer is yes, that flow is simply ignored since its counterpart flow has already been taken into account.

§4.3 Exemplary Apparatus

Figure 6:
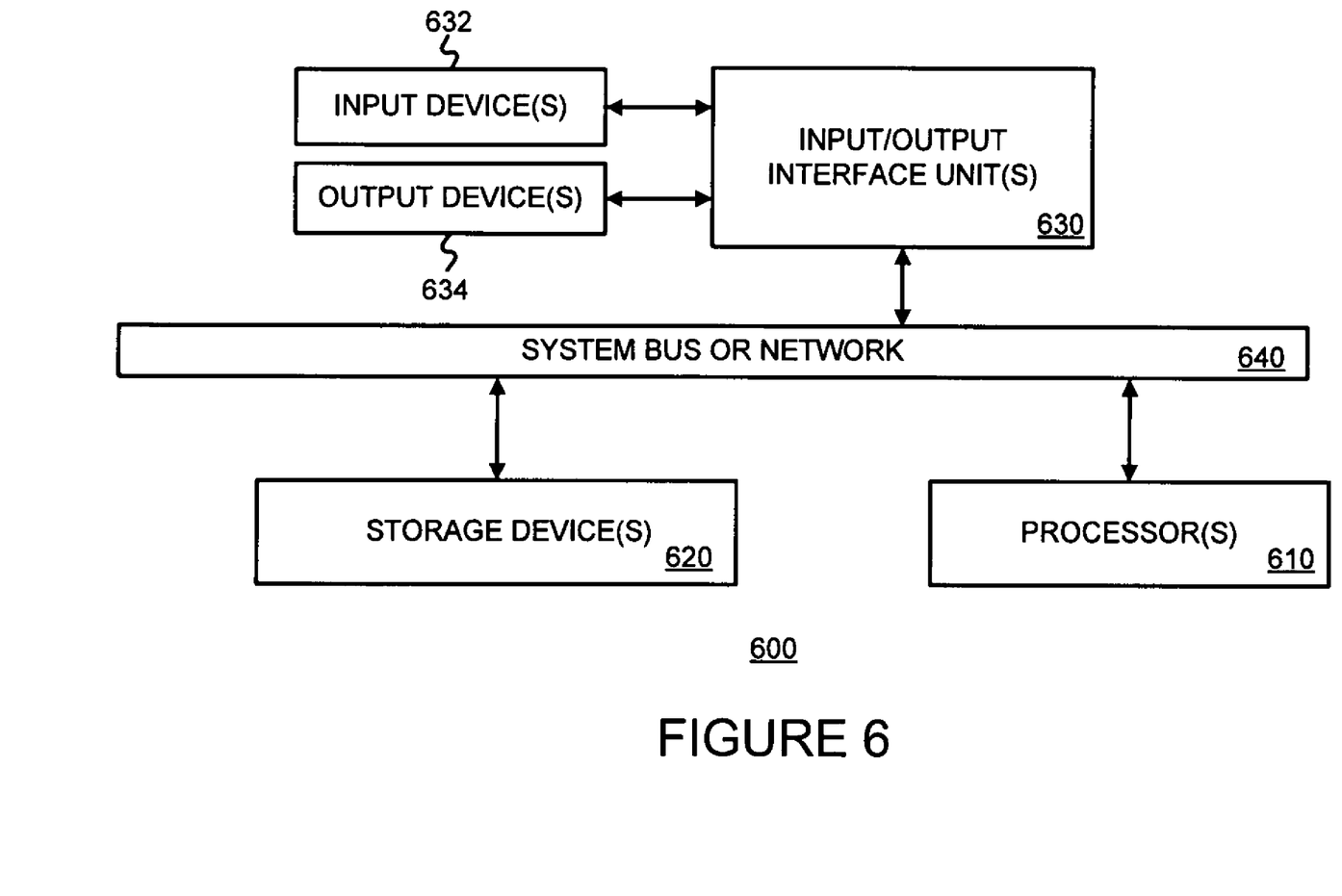
FIG. 6 is a block diagram of an exemplary apparatus that may perform various operations, and store various information generated and/or used by such operations, in a manner consistent with the present invention.

FIG. 6 is high-level block diagram of a machine 600 that may perform one or more of the processes described above, and/or store information used and/or generated by such processes. The machine 600 basically includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630. The one or more processors 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 620 and/or may be received from an external source via one or more input interface units 630. Thus, various acts and methods described above may be implemented as processor executed software modules, stored on a tangible medium.

In one embodiment, the machine 600 may be one or more conventional personal computers, servers, or routers. In this case, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

Referring back to FIGS. 1 and 5, each of the host (140-149), the interacting partner (180), the nodes (130-139) and the diagnosing agent (110) may be implemented on one or more machines 600.

§4.4 Problem Formulation and Solution

Embodiments consistent with the present invention differentiate between network traffic data which contains relay activity and that which does not. The basic difference between these two situations is the number of time slots in which the same flow pair is simultaneously active. That is because, although uncorrelated flows may share few time slots but it is very unlikely that the number of such time slots is high. Otherwise these flows shouldn't be considered as uncorrelated because in that case whenever one flow was active the other flow would have been active as well. On the other hand, for a flow pair relaying information with a maximum tolerable delay constraint, if one flow is active for a given time slot, with high probability the other flow is active in order to relay information before the time constraint elapses.

First, the number of time slots shared by the same flow pair is denoted as f. Clearly, a high value of β indicates a correlation between these two flows and hence is indicative of relay activity. The rest of this section explains the details of differentiating these relay and non-relay situations based on β.

For a given node in the network, let $I_i$ denote the incoming flows and $O_j$ denote the outgoing flows, where i=1, 2, . . . , m and j=1, 2, . . . , n. For each incoming flow and each outgoing flow, a random number is generated and assigned to the corresponding flow. Let $RI_i$ and $RO_j$ denote the random numbers assigned to the incoming flow $I_i$ and the outgoing flow $O_j$ respectively. Here $RI_i$ and $RO_j$ are assigned such that they are independently drawn from the probability mass function P(n), which is:

$$P(n) = \begin{cases} \frac{1}{2}, & \text{if } n = +\gamma \\ \frac{1}{2}, & \text{if } n = -\gamma, \text{ where } \gamma \in \mathfrak{R} \\ 0, & \text{elsewhere} \end{cases} \quad (1)$$

The reason P(n) is chosen as a bipolar symmetric PMF is that the distribution of $RI_i \times RO_j$ is bipolar symmetric. This distribution turns out to be bipolar symmetric as long as P(n) itself is chosen as bipolar symmetric.

Meanwhile, let $\hat{i}_t$ be the indices of the m active incoming flows within a given time slot t where $\hat{i}_t \in \{1, 2, 3 \ldots m\}$. Similarly let $\hat{j}_t$ be the indices of n active outgoing flows in time slot t where $\hat{j}_t \in \{1, 2, 3 \ldots n\}$. Then for each time slot t, the corresponding random numbers for active incoming flows within t are summed and multiplied to the sum of the random numbers assigned to active outgoing flows. This step is repeated for each time slot and result of each step is accumulated. More formally, the following summation S is calculated for time slots t=1, 2, 3, . . . , T:

$$S = \sum_{t=1}^{T} \left[ \sum_{i \in \hat{i}_t} RI_i \times \sum_{j \in \hat{j}_t} RO_j \right] \quad (2)$$

This S value serves as the feature which is used to classify whether the network traffic of a node contains relay activity or not. The reason for this becomes more clear if Equation (2) is rewritten as:

$$S = \sum_{t=1}^{T} \left[ \sum_{i \in \hat{i}_t} \sum_{j \in \hat{j}_t} RI_i \times RO_j \right] \quad (3)$$

Notice that S is effectively the summation of a new set of random numbers which are assigned to each active incoming-outgoing flow pair for each time slot. Therefore, Equation (3) can be written as:

$$s = \sum_{a=1}^{A} M_a \quad (4)$$

where A is the number of terms such that $$\text{``}A = \sum_{t=1}^{T} \sum_{i \in \hat{i}_t} \sum_{i \in \hat{j}_t} 1\text{''}$$

and $M_a$'s are random numbers which are drawn from probability mass function $\hat{P}(n)$:

$$\hat{P}(n) = \begin{cases} \frac{1}{2}, & \text{if } n = +\gamma^2 \\ \frac{1}{2}, & \text{if } n = -\gamma^2, \text{ where } \gamma \in \mathcal{R} \\ 0, & \text{elsewhere} \end{cases} \quad (5)$$

Rigorously speaking, the $M_a$ values may not be independent since a single $RI_i$ or a single $RO_j$ may, and probably will, contribute to multiple $M_a$, values. However, for practical purposes $M_a$ values are considered as i.i.d. random variables with probability mass function $\hat{P}(n)$. As a matter of fact, this is not a very crude assumption.

Suppose $M_1 = RI_i \times RO_j$ and $M_2 = RI_i \times RO_k$. Since P(n) is bipolar symmetric, it can be written as $P(M_1|M_2) = P(M_1)$ and conclude that $M_1$ and $M_2$ are independent. This is because so long as $RI_i$ and $RO_j$ have bipolar symmetric distribution, knowing $RI_i$ doesn't give any information about $RI_i \times RO_j$. However, suppose the following values were also given or known: $M_3 = RI_m \times RO_j$ and $M_4 = RI_m \times RO_k$. Then, by using $M_3$ and $M_4$ one could determine the polarity relation of $RO_j$ and $RO_k$ such that, if $M_3 = M_4$ then $RO_j = RO_k$ as well and if $M_3 \neq M_4$ then $RO_j \neq RO_k$. This information could later be used to determine $M_1$ regarding its bipolar symmetric properties such that if $RO_j = RO_k$, then $M_1 = M_2$ and if $RO_j \neq RO_k$ then $M_1 = -M_2$. So, knowing $M_2$, $M_3$ and $M_4$ tells everything about $M_1$. Therefore $M_1$ is not independent from the collection ($M_2$, $M_3$, $M_4$). However, in order this to happen, flow $I_i$ has to be active in the same time slot with $O_j$ and in another or the same time slot with $O_k$. Also $I_m$ has to have a similar property such that it should be active in the same time slot with $O_j$ and in another or the same time slot with $O_k$. And all this has to happen in a short period of time before "A" terms are collected. The probability of such event is not very high and therefore independent $M_a$ assumption is quite realistic.

Assuming independent $M_a$ values, if there is no correlation between any pair of incoming and outgoing flows, in other words if there is no relaying flow pairs, then Equation (4) holds and S will simply be interpreted as the $y^{th}$ sum of independent random variables. (On the other hand if $y^{th}$ outgoing flow ($RO_y$) relays the packets from $x^{th}$ incoming flow ($RI_x$), both $RI_x$ and $RO_y$ will be active in a number of time slots ($\beta$), then the sum in Equation (4) can be written as:

$$S = \beta(RI_x \times RO_y) + \sum_{a=1}^{A-\beta} M_a, \text{ where } \beta \geq 0 \quad (6)$$

More generally if there are F such incoming-outgoing flow pairs, namely $If_i$ and $O_{fo}$, where $f_i$ and $f_o$ indicate incoming and outgoing flow indices of $f^{th}$ pair respectively (f=1, 2, ... F), and each of these pairs are simultaneously active within $\beta_f$ time slots, then the summation S can be written as:

$$S = \sum_{f=1}^{F} \beta_f (RI_{fi} \times RO_{fo}) + \sum_{a=1}^{A-\beta} M_a, \text{ where } \beta = \sum_{f=1}^{F} \beta_f \text{ and } \beta_f \geq 0 \forall f \quad (7)$$

Notice that Equation (7) reduces to Equation (6) when F=1 indicating a single relaying input-output flow pair and further reduces to Equation (4) when F=0 indicating no relay.

Since F indicates the number of relaying flow pairs, our goal is now to identify the observed F value as being zero or greater than zero. This discrimination can be performed when the summation S is considered as a random variable whose distribution is determined by Equation (7). It can be shown that, under certain conditions, the variance of $S(\sigma_S^2)$ in the case when F>0 is greater than in the case when F=0. Therefore, one can make a S decision about the presence of relay activity based on the variance of calculated S values.

In order to investigate $S(\sigma_S^2)$, the term $$"\sum_{a=1}^{A-\beta} M_a"$$

in that equation can be considered as the displacement (D) value of a one dimensional random walk process with step size $\gamma 2$ and total number of steps $A-\beta$. Briefly, in 1-D random walk process, starting from origin, only one step with a constant step size is taken towards either right or left each time. The distance between last arrived point and the origin is called "displacement" (D), which is simply the sum of the distance traveled for each step considering the distance traveled is positive for right steps and negative for left. As a result, D is shown to be approximated by a Gaussian distribution such that:

$$P(D=d|k) \sim \aleph(0, 4s^2 kp(1-p)) \quad (8)$$

where k is the number of total steps, s is the step size and p is the probability to take a right step. Therefore the value produced by $$"\sum_{a=1}^{A-\beta} M_a"$$

can be considered as random number coming from the distribution $N(0, \gamma^4(A-\beta))$ since the probability of going right is ½.

To further analyze the term $$"\sum_{f=1}^{F} \beta_f (RI_{fi} \times RO_{fo})"$$

in Equation (7), denote $P_\beta(n)$ as the probability mass function of $\beta_f$ values. It is clear that $P_\beta(n)=0$ for $n \leq 0$ since the number of time slots within which a relay is active cannot be negative. Also $\hat{P}(n)$ is the probability mass function which produces $RI_{fi} \times RO_{fo}$ values as described earlier and shown in Equation (5). Therefore $\beta_f (RI_{fi} \times RO_{fo})$ values come from the probability mass function $P_I(n)$ such that:

$$P_I(\gamma^2 \times n) = \frac{1}{2} P_\beta(|n|), \text{ where } -\infty < n < \infty \quad (9)$$

Note that $P_I(n)$ is zero for all n which are not integral multiple of $\gamma^2$. Also $P_I(n)$ is a zero mean probability mass function since it is symmetric and therefore its variance can be calculated as:

$$\sigma_I^2 = \sum_{n=-\infty}^{\infty} (\gamma^2 n)^2 P_I(\gamma^2 n) \quad (10)$$
$$= \sum_{n=-\infty}^{\infty} (\gamma^2 n)^2 \frac{1}{2} P_\beta(|n|)$$
$$= \sum_{n=0}^{\infty} (\gamma^2 n)^2 P_\beta(n)$$
$$= \gamma^4 \times E[(\beta_f)^2]$$

where $E[(\beta_f)^2]$ denotes the expected value of the squares of $\beta_f$ values.

Since $\beta_f (RI_{fi} \times RO_{fo})$ values are independent from each other for each $f \in \{1, \ldots, F\}$ and $$"\sum_{f=1}^{F} \beta_f (RI_{fi} \times RO_{fo})"$$

is independent from $$"\sum_{a=1}^{A-\beta} M_a",$$

the variance of S values calculated in Equation (7) can be written as:

$$\sigma_s^2 = F\gamma^4 E[(\beta_f)^2] + \gamma^4(A - \beta), \text{ where } \beta = \sum_{f=1}^{F} \beta_f \quad (11)$$

According to the above equation, one can say that $\sigma_S^2$=F is greater in the case when F>0 than the case when F=0 as long as $$F \times E[(\beta_f)^2] > \sum_{f=1}^{F} \beta_f.$$

This can simply be shown as follows:

$$F\gamma^4 E[(\beta_f)^2] + \gamma^4(A - \beta) > (F\gamma^4 E[(\beta_f)^2] + \gamma^4(A - \beta))_{F=0} \quad (12)$$
$$F\gamma^4 E[(\beta_f)^2] + \gamma^4(A - \beta) > \gamma^4 A$$
$$F \times E[(\beta_f)^2] + (A - \beta) > A$$
$$F \times E[(\beta_f)^2] > \beta$$
$$F \times E[(\beta_f)^2] > \sum_{f=1}^{F} \beta_f$$

The above constraint is satisfied as long as $\beta_f$ values are greater than one. Therefore, relay nodes can be identified by looking at $\sigma_S$ values as long as the relay flows are simultaneously active for more than one time slot. This is a purely theoretic constraint and in practice a relay has to be active for sufficiently enough number of time slots in order to be detected. Fortunately, most of the relay scenarios have to satisfy this constraint in order to serve their purposes.

Another interesting observation is that the above constraint is independent of γ. Therefore, the system performance doesn't change for different values of γ. Therefore, in the experiments this value is simply set to γ=1.

Estimating $\sigma_S^2$ in practice is the first task to be performed. Then the system can declare the node as being relay if the estimated $\sigma_S^2$, is sufficiently larger than the anticipated $\sigma_S^2$ if the node is not relaying at all. For this purpose, as a very brief summary, the system computes a number of S values simultaneously but independently in order to estimate $\sigma_S^2$ value. The details of the algorithm and its analysis are explained in the following sections.

§4.4.1 Detection Methods and the Analysis

In this section, the proposed methods are discussed which compute S values in order to estimate $\sigma_S^2$ and consequently performs relay detection. Following that, space and time requirements of these algorithms are discussed.

The S values are calculated by the procedure, Calculate_S listed below, which basically performs the operation defined in Equation (2). The procedure takes the parameter A, which is introduced in Equation (4) and indicates the number of terms added together. Here I and O indicate the list of incoming and outgoing flows respectively. Also the function "Reverse( )" returns the flow which has complete reverse direction of a given flow. The method then checks if the reverse flow has been assigned a random number previously in order to deal with the problem of request-response based protocols mentioned earlier.

Notice that Calculate_S computes a single S value. In order to accurately estimate $\sigma_S^2$, a number of S values have to be collected. This can be done by executing multiple Calculate_S instances simultaneously. The procedure, Estimate_$\sigma_S^2$ listed below, implements the estimation procedure by employing Calculate_S. The input parameter T indicates the number of simultaneous Calculate_S executions.

It should be noted that Estimate_$\sigma_S^2$ outputs a single $\sigma_S^2$ value whenever A terms are collected. The time elapsed until A terms are collected totally depends on the input parameters and the characteristics of the underlying network traffic. In a typical scenario, the parameters can be chosen so that the elapsed time to collect A terms is around few seconds. Therefore, each estimated $\sigma_S^2$ value would correspond to a few seconds of network traffic. For a continuous operation Estimate_$\sigma_S^2$ should be executed repeatedly.

The final decision is given based on the difference between estimated $\sigma_S^2$ values and the anticipated $\sigma_S^2$ value when the node is not relaying at all. This value can be written more formally as:

$$\Psi = \sigma_S^2 - \gamma^4 A \quad (13)$$

In the experiments, a recent few Ψ values are incorporated in the decision process such that if the sum of "d" most recently calculated Ψ values exceeds a threshold "th" then the corresponding host is declared as performing relay activity within the corresponding time slice.

Before beginning to analyze the method, it should be emphasized that the parameters A and T are constant values which are in the order of few hundreds at the most and they do not vary with the input size. As for the investigation of time requirements, Calculate_S loops over the active incoming flows and active outgoing flows separately, and repeats these loops for a constant number of time such that it repeats until A terms are collected for summation. Therefore CalculateS is run in O(m+n) time, where m and n are the number of incoming and outgoing flows respectively. Practically speaking, the method may actually loop much fewer times than m+n since only a fraction of incoming and outgoing flows are active for a given time slot.

Estimate_$\sigma_S^2$ calls Calculate_S exactly T times which is indeed a constant parameter. Therefore, Estimate_$\sigma_S^2$ also runs in O(m+n) time. However, the time requirements of the whole system actually depends on how many times the Estimate_$\sigma_S^2$ is executed. But again for a given fixed time interval, Estimate_$\sigma_S^2$ is called repeatedly for a constant number of times. Therefore for a given fixed time interval, which is typically the duration of a typical relay activity, the decision is given in linear time.

The space required by the algorithm, on the other hand, is mainly composed of the table which keeps assigned random values to the incoming and outgoing flows. Hence, it can be concluded that the algorithm requires linear space as well.

The ultimate goal of the proposed scheme is to identify network nodes that perform relay activity, which are also called as "relay nodes". Aside from relay traffic, in almost every case, these relay nodes also receive and transmit legitimate non-relay traffic.

---

Method 1 Calculate_S (A, I = {$I_1$,., $I_m$}, O = ($O_1$,., $O_n$}
S ← 0
noOfTerms ← 0
timeSlot ← currentTimeSlot
while noOfTerms ≤ A do
    incomingSum ← 0

-continued

```
    actInFl ← 0
    for all active incoming flow I_i within timeSlot do
        If RO_i is assigned to Reverse(I_i) then
            continue;   //In order to avoid request-response problem
ignore
                        this flow
        end If
        If RI_i is not assigned to I_i then
            assign RI_i randomly [as in Eq(1)]
        end If
        incomingSum ← incomingSum + RI_i
        actInFl ← actInFl + 1
    end for
    outgoingSum ← 0
    actOutFl ← 0
    for all active incoming flow O_j within timeSlot do
        if RI_j is assigned to Reverse(O_j) then
            continue;   //In order to avoid request-response problem
ignore                              this flow
        end if
        if RO_j is not assigned to O_j then
            assign RO_j randomly [as in Eq(1)]
        end if
        outgoingSum ← outgoingSum + RO_j
        actOutFl ← actOutFl + 1
    end for
    noOfTerms ← noOfTerms + actInFl × actOutFl
    timeslot ← nextTimeSlot
    S ← S + incomingSum × outgoingSum
end while
output S
Method 2 Estimate σ_S^2 (A, T, I, O)
σ_S^2 ← 0
for i = 1 to T do
    S_i ← Calculate_S (A, I, O)
    σ_S^2 ← σ_S^2 + (S_i)^2
end for
output σ_S^2
```

§4.5 Conclusions

Due to their potential harmful effects, it is important to identify relay nodes in the network. In this work, the delay constrained relay detection problem is investigated. A statistical solution, which has linear time and space complexity, is proposed. The proposed method is lightweight and simple, therefore it is scalable and can be used in large scale implementations which may require real time detection.

For many applications identifying relay nodes is sufficient to take an appropriate action. In this case, the contribution of the proposed scheme is to a great extent in terms of computational complexity since it flags the relay nodes very efficiently. If an application requires flow level relay identification, on the other hand, one of the existing relay flow detection techniques can be subsequently applied to the relay nodes which have been flagged by the proposed method. The contribution here is also in terms of computational complexity as quadratic time relay flow detection algorithms now have to be executed only for flagged nodes rather than every node in the network. In either case, embodiments consistent with the present invention make the relay detection problem scalable for large scale implementations where thousands of nodes might be monitored simultaneously in real time.

Experimental results show that the proposed scheme is quite robust against various possible adversarial or nonadversarial modifications on the underlying network traffic. In summary, the experiments reveal that embodiments consistent with the present invention still work to some extent under the presence of packet delays which could be introduced due to packet processing in the relay node or to adversarial purposes. Also the embodiments consistent with the present invention can detect the relay activity even if the flows contain chaff packets which are intended to defeat relay detection systems.

Embodiments consistent with the present invention may also include methods which can increase the detection performance such that higher true positives rates and lower false positive rates can be achieved. One possible way to achieve this could be using a different alignment of time slots for each of the simultaneous S calculations (i.e., time slot boundaries are not aligned for each simultaneous Calculate_S execution). This could enable some of the calculated S values to catch relay activity which the others might have missed. Also an adaptive selection of algorithm parameters, which adjust the parameters regarding to the encountered traffic characteristics, might be very useful especially when the traffic characteristics tend to change over time. Finally, embodiments consistent with the present invention may be employed in a large scale implementation such that, it would monitor thousands of network nodes and detect relay activity in real time or almost real time.

As can be appreciated from the foregoing, embodiments consistent with the present invention may advantageously detect or help detect malware infection of a host. Such embodiments may avoid problems with host-based malware detection.

What is claimed is:

1. A method for determining whether or not a node in a network is a relay node, the method comprising:
   a) for each of a plurality of flows, assigning, by at least one computer, a random number to an active flow, wherein the random number is drawn from a known distribution;
   b) for each of a plurality of time slots,
      1) determining any incoming flows to the node,
      2) determining any outgoing flows from the node,
      3) summing the random numbers assigned to any of the incoming flows to generate a first sum,
      4) summing the random numbers assigned to any of the outgoing flows to generating a second sum,
      5) multiplying the first sum with the second sum to generate a product associated with the time slot,
      by the at least one computer;
   c) summing, by the at least one computer, products over the plurality of time slots to obtain a summed product;
   d) repeating, by the at least one computer, (a)-(c) using an updated random number for each of the plurality of flows, thereby obtaining a plurality of summed products;
   e) determining, by the at least one computer, a variance of the plurality of summed products;
   f) comparing, by the at least one computer, the determined variance with a threshold to obtain a comparison result;
   g) determining, by the at least one computer, whether or not the node is a relay node using the comparison result, wherein if the determined variance is greater than the threshold, then determining that the node is a relay node, otherwise determining that the node is not a relay node; and
   h) executing, by the at least one computer, a relay node protection policy using the determination of whether or not the node is a relay node.

2. The method according to claim 1, wherein the act of summing random numbers assigned to any of the incoming flows to generate the first sum includes identifying if another flow has an exact reverse direction of a particular incoming flow, and if so, ignoring the particular incoming flow such that its assigned random number is not summed in the first sum, and wherein the act of summing random numbers assigned to any of the outgoing flows to generate the second sum includes identifying if another flow has an exact reverse direction of a particular outgoing flow, and if so, ignoring the particular outgoing flow such that its assigned random number is not summed in the second sum.

3. The method according to claim 1, wherein the incoming flow associated with a particular time slot is measured at a time interval differently aligned from the particular time slot of the corresponding outgoing flow to achieve a higher true positive rate of evaluating the node as a relay node.

4. The method according to claim 1, wherein the known distribution has a zero mean.

5. The method according to claim 1, wherein the repeating (a)-(c) using an updated random number for each of the plurality of flows, thereby obtaining the plurality of summed products is performed at least 100 times.

6. Apparatus for facilitating host malware detection, the apparatus comprising:
   one or more processors;
   at least one input device; and
   one or more storage devices storing processor-executable instructions which, when executed by one or more processors, perform:
   a) for each of a plurality of flows, assigning a random number wherein the random number is drawn from a known distribution;
   b) for each of a plurality of time slots,
      1) determining any incoming flows to a node,
      2) determining any outgoing flows from the node,
      3) summing the random numbers assigned to any active flow of the incoming flows to generate a first sum,
      4) summing the random numbers assigned to any active flow of the outgoing flows to generating a second sum,
      5) multiplying the first sum with the second sum to generate a product associated with the time slot,
   c) summing products over the plurality of time slots to obtain a summed product;
   d) repeating (a)-(c) using an updated random number for each of the plurality of flows, thereby obtaining a plurality of summed products;
   e) determining a variance of the plurality of summed products;
   f) comparing the determined variance with a threshold to obtain a comparison result;
   g) determining whether or not the node is a relay node using the comparison result, wherein if the determined variance is greater than the threshold, then determining that the node is a relay node, otherwise determining that the node is not a relay node; and
   h) executing a relay node protection policy using the determination of whether or not the node is a relay node.

* * * * *